US00RE50211E

(19) United States
(12) Reissued Patent
Singhal

(10) Patent Number: US RE50,211 E
(45) Date of Reissued Patent: Nov. 12, 2024

(54) APPARATUS AND METHOD FOR A WIRELESS EXTENSION COLLAR WORN AROUND A HUMAN NECK

(71) Applicant: Tara Chand Singhal, Torrance, CA (US)

(72) Inventor: Tara Chand Singhal, Torrance, CA (US)

(21) Appl. No.: 15/893,442

(22) Filed: Feb. 9, 2018

Related U.S. Patent Documents

Reissue of:
(64) Patent No.: 9,271,068
Issued: Feb. 23, 2016
Appl. No.: 13/374,196
Filed: Dec. 15, 2011

U.S. Applications:
(60) Provisional application No. 61/573,866, filed on Sep. 13, 2011.

(51) Int. Cl.

| | |
|---|---|
| ***G10L 21/00*** | (2013.01) |
| ***H04B 1/38*** | (2015.01) |
| ***H04B 1/3827*** | (2015.01) |
| ***H04M 1/00*** | (2006.01) |
| ***H04R 1/32*** | (2006.01) |

(52) U.S. Cl.
CPC ..... *H04R 1/32* (2013.01); *H04B 1/385* (2013.01); *H04R 2201/023* (2013.01); *H04R 2217/03* (2013.01); *H04R 2499/11* (2013.01)

(58) Field of Classification Search
CPC H04R 1/32; H04R 2201/023; H04R 2217/03; H04R 2499/11; H04B 1/385
See application file for complete search history.

(56) References Cited

U.S. PATENT DOCUMENTS 4,070,553 A * 1/1978 Hass ..... H04M 1/05 381/151
4,084,139 A * 4/1978 Jakobe ..... A45F 5/00 224/201

(Continued)

OTHER PUBLICATIONS

Audio Spot Light(R) Directional Sound System Technical Specication Data sheet (2 pages) from Holosonic Research Lab Inc. www.holosonic.com.

(Continued)

*Primary Examiner* — Colin M Larose
(74) *Attorney, Agent, or Firm* — Aldo Noto, Esq.; RIMON PC

(57) ABSTRACT

A wireless extension device to end-user wireless device has a collar that is worn around the neck. The collar has two end-members that are positioned on the two collarbone areas next to the neck. The end-members have positioned directional speakers therein that radiate sound in the direction of two ears of the human wearing the collar around the neck. The end-members have positioned microphones that pick up voice commands of a human wearing the collar around the neck. The wireless collar extension device is used for hands free communication with end-user wireless device, without having to plug a prior art BLUETOOTH earpiece into one of the ears. The collar using voice commands can control operational mode of the end-user device pertaining to communications, music, computations, record, send and enter data and images.

25 Claims, 12 Drawing Sheets

(56) References Cited

U.S. PATENT DOCUMENTS 4,426,733 A * 1/1984 Brenig ..... H04B 1/46 367/198
6,091,832 A * 7/2000 Shurman ..... G02C 11/06 2/422
6,424,820 B1 * 7/2002 Burdick ..... H04B 5/0081 455/132
6,980,165 B2 * 12/2005 Yuasa ..... H01Q 1/273 343/718
7,072,686 B1 * 7/2006 Schrager ..... H04M 1/6066 379/88.01
7,801,315 B2 * 9/2010 Watanabe ..... H04R 1/323 381/111
8,009,838 B2 * 8/2011 Lee ..... H04R 1/40 381/77
8,498,425 B2 * 7/2013 Graylin ..... H04M 1/05 381/74
2002/0097189 A1 * 7/2002 Coloney ..... H01Q 1/245 343/702
2005/0009583 A1 * 1/2005 Cheung et al. ..... 455/575.6
2005/0281427 A1 * 12/2005 Gantz et al. ..... 381/370
2009/0143103 A1 * 6/2009 Chishti et al. ..... 455/558
2009/0274335 A1 * 11/2009 Cheung ..... H04R 5/0335 381/374
2010/0009719 A1 * 1/2010 Oh ..... H04M 1/72583 455/563
2010/0180754 A1 * 7/2010 Brown et al. ..... 84/610
2011/0020771 A1 * 1/2011 Rea et al. ..... 434/114

OTHER PUBLICATIONS

HSS H450 (R)Techncial Specification Data sheet (3 pages) from American Technology Corporation.

Audio Spot Light(R) Sound Communications ( 4 pages), Literature on Spot light of sound from Holosonic Research Lab. Inc, www.holosonic.com.

* cited by examiner

At step 100, creating a collar that has two end-members and a joining member.

At step 102, positioning directional speakers in the end-members.

At step 104, using an ultrasound frequency carrier wave modulated by an audio signal in the directional speakers use to deliver audio sound to human ears without a demodulator.

At step 106, housing in the end-members of the collar, integrated circuits with embedded logic, controls, wireless circuits, transmitting and receiving antennas, microphones, and batteries, in addition to the directional speakers;

At step 108, using the end-members as a wireless communication device to another wireless device.

At step 110, providing a logic in the integrated circuits.

At step 112, providing a logic in the integrated circuits for receiving voice commands that control the operation of the another wireless device and wirelessly transmit such commands to the another device;

At step 114, proving a logic in the integrated circuits for receiving device status from the another device and translate the another device status data into audio signals for the human wearing the collar;

At step 116, using the voice commands to change operation mode of end-user wireless device.

At step 118, orienting the transmitting pattern of the transmitting antenna to keep transmitted radiation away from the head area of the human wearing the collar.

At step 120, creating a joint in the center of the joining member that joins two halves of the collar to facilitate removal and wear of the collar on the human neck.

At step 122, adjusting the joint to adjust the collar for different human neck sizes.

At step 124, providing hinges for movement between end-members and the joining member.

At step 126, providing a tilt mechanism to fine tune the orientation of the directional speakers towards the human ears.

At step 128, making the collar of a light weight material

At step 130, having rubber cushions in the end-members that facilitate the end-members to stay on the collarbones.

FIGURE 6

APPARATUS AND METHOD FOR A WIRELESS EXTENSION COLLAR WORN AROUND A HUMAN NECK

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS REFERENCE

This application claims priority from provisional application Ser. No. 61/573,866, filed Sep. 13, 2011, titled "Apparatus and Method for a Wireless Extension Collar for Use with Mobile and Fixed Wireless Devices" of Tara Chand Singhal. The application Ser. No. 61/573,866 is incorporated herein by reference.

FIELD OF THE INVENTION

Apparatus and method for a wireless extension collar device that is worn around a human neck in lieu of earphones and headphones, as a wireless extension of an end-user wireless device such as, a smart phone, a home and automobile-based device, and a command and control device, are described.

BACKGROUND

Headphones are used for private listening such as for music. They are also used for private communication as in telephone communication. These types of headphones are worn over the head. Office secretaries and order taking clerks use such headphone in a business environment.

A single ear piece that is plugged in the ear canal is also used in applications that include portable MP3 music playing devices. Bluetooth ear pieces are also plugged in the ear canal to communicate with a smart phone that is positioned in the vicinity of a person for hands free operation of the smart phones.

Use of such headphones, earphones, and Bluetooth® ear pieces make them uncomfortable for extended wearing as they are required to be plugged into the ear canal or cupped over the entire ear. This mode of use makes them both unsightly and uncomfortable to wear or use. They affect normal hearing while worn as they are intended to cut out ambient noise from the environment.

In communication devices, such as cell phones, the Bluetooth version of the earpiece that has become very popular lately to provide a hands free cell phone operation, also directs RF radiation in close vicinity to the brain.

Therefore, it is an objective of the embodiments herein to have headphone, earphones, and Bluetooth earphones that do not have the drawbacks of the prior art as summarized above. Yet another objective is to have more versatile and user-friendly music listening and wireless communication and command and control devices to work in conjunction with such end-user devices.

SUMMARY

The embodiments described herein use directional speakers and microphones in a collar worn around the human neck. Prior art related to directional speaker technology is illustrated with reference to FIG. 1. In this technology, an ultrasonic frequency carrier is used to radiate a directional ultrasound beam. The ultrasound beam signal is used as a carrier that is modulated with an audio signal. When the ultrasound beam is directed towards a human that is within the beam, only that human as a listener can hear the audio signal. Directional speakers based on this technology enable a highly directive audio signal to be radiated so that it can be targeted to an individual in a crowd.

This technology on directional speakers using ultrasound carrier waves was perfected by Dr. Joseph Pompei of Massachusetts Institute of Technology in the 1990's. Dr. Joseph Pompei founded a company named Holosonic Research Lab Inc., based in Watertown, Mass., USA that makes directional speakers based on this technology. Directional speakers are made in different sizes as provided on the company's website and the literature therein for different applications. Other companies such as American Technology Corporation also manufacture and market directional speakers.

See attached IDS form 8b that identifies and attaches literature from the Holosonic company website. As described on the website, the directional speakers based on this technology are being used in many applications, the chief application among them being for advertisement.

The embodiments described herein make use of such technology of directional speakers for a different application, that of a headphone. In the embodiments herein, a half-collar designed to be worn around a neck of a human, has two end-members where two directional speakers and microphones are placed that may radiate an audio signal directly towards the human ear without the need to wear a headphone over the ear or plug an ear piece in the ear canal. Thus, the embodiments herein are intended to and can be used in lieu of a headphone, ear piece, and Bluetooth ear piece, and it is believed provide many advantages over the prior art headphones and earpieces.

The benefits of such embodiments are that there is no ear plug in the ear and a headphone is not used over the head. That is, the embodiments herein provide a head free as well as a hands free operation. Since nothing is plugged in the ear canal or cupped over the ears, normal hearing is not affected. Hence, such a collar of the embodiments described herein may be worn for a better part of the day and used for a variety of applications including communication with and command and control of many end-user devices.

The collar may have a joint at the back that makes it easy to remove and put on around the human neck. The collar shape is angled vertically at back and changes to flat shape on the collarbone area enabling the two end-members of the collar with the directional speakers to lie flat on the collarbone area. The collar can be worn on top of clothing or under light clothing. Such a collar is not likely to affect wearing of jewelry, such as, either earrings or necklaces.

The collar is light-weight and may be on the order of a few ounces. The weight of the collar is distributed on the neck and the collarbone area. The collar is made of material that may come into contact with the body and may be made of a smooth material.

The directional speakers enable only the wearer to hear the audio. There are two built-in microphones for better sound pick-up along with the two directional speakers. The collar may have two independent audio systems, one each in each end-member of the collar, that can be used individually as either left or right side or both with a stereo effect based upon a user's preference.

The collar worn around the neck creates a distance between the collar antenna and the brain and thus keeps radiation away from the brain as compared to the Bluetooth ear pieces that are commonly used with smart phones.

These and other aspects of the embodiments herein are described and would become more clear with the help of the accompanying drawings and the accompanying description.

BRIEF DESCRIPTION OF THE DRAWINGS

Some of the novel features of this invention will be best understood from the accompanying drawings, taken in conjunction with the accompanying description, in which similar reference characters refer to similar parts, and in which:

FIG. 6 is a method block diagram that illustrates use for the wireless collar of the embodiments herein.

DESCRIPTION

Introduction

Figure 1:
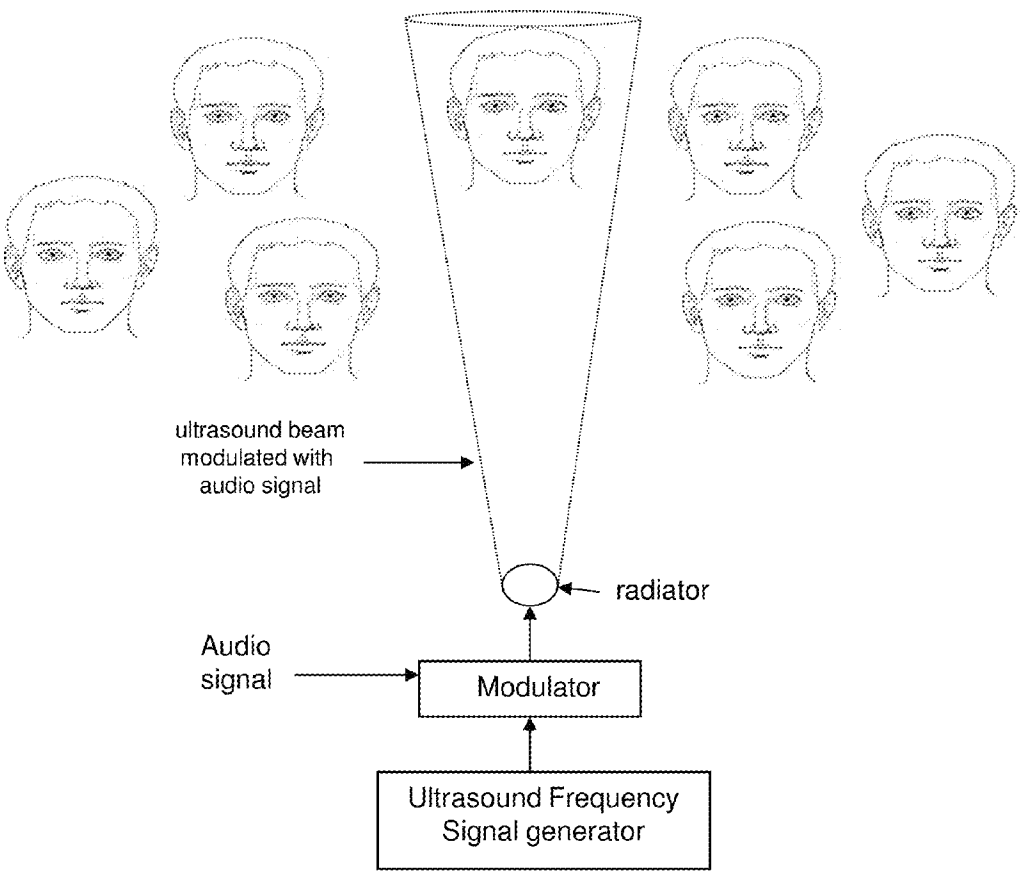
FIG. 1 is block diagram that illustrates the prior art technology of directional speakers.
Figure 2A:
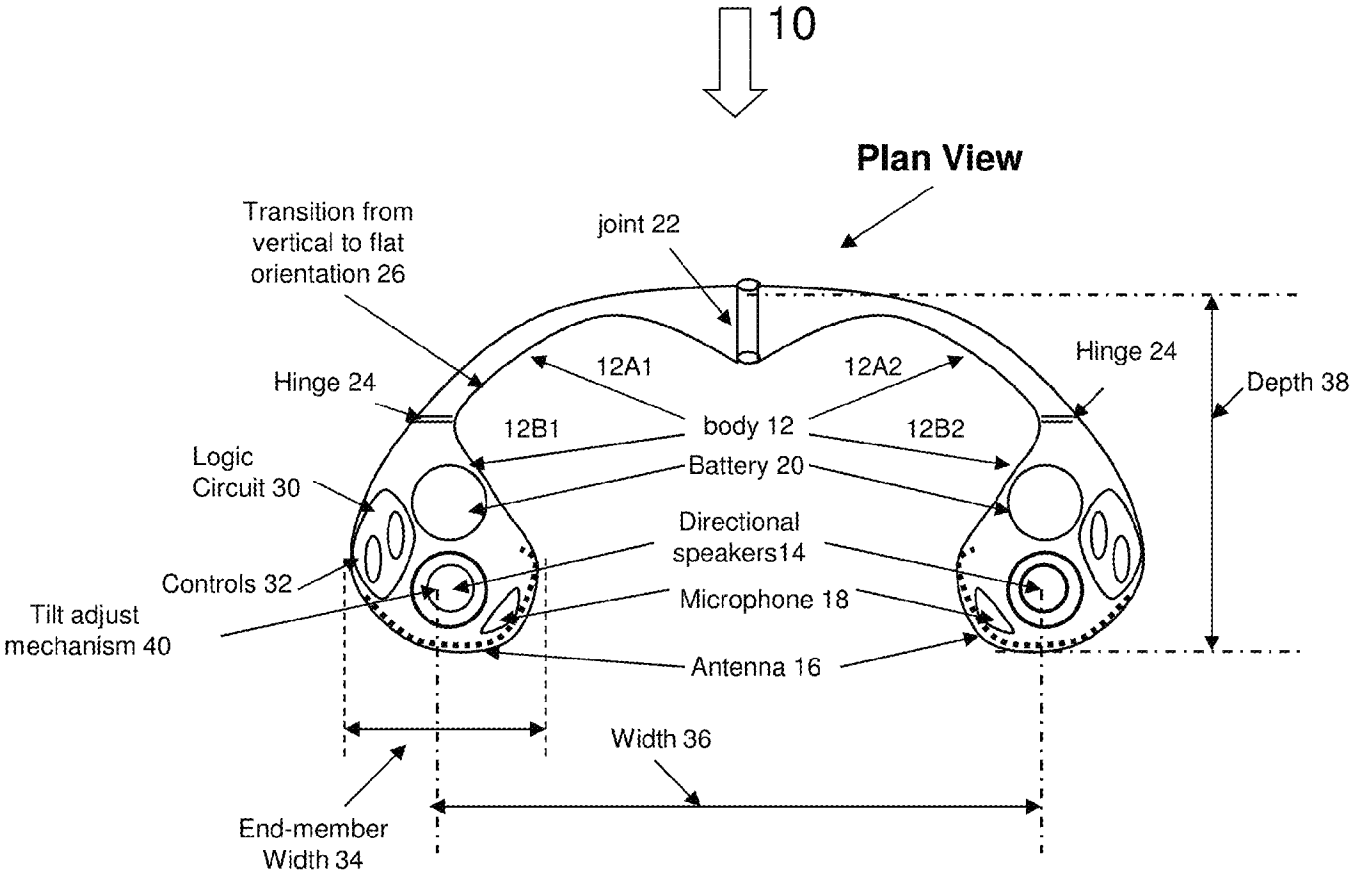
FIGS. 2A and 2B are block diagrams that illustrate plan and elevation views of a wireless extension collar of the embodiments herein for replacing use of headphones and earpieces.
Figure 2B:
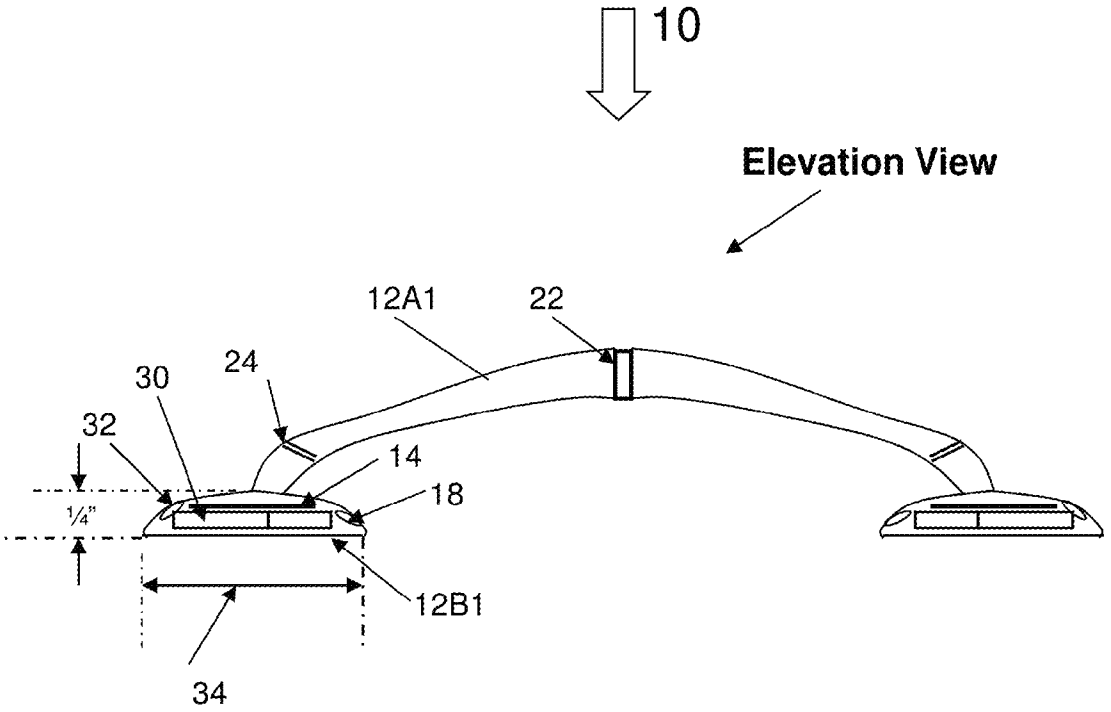
Figure 2C:
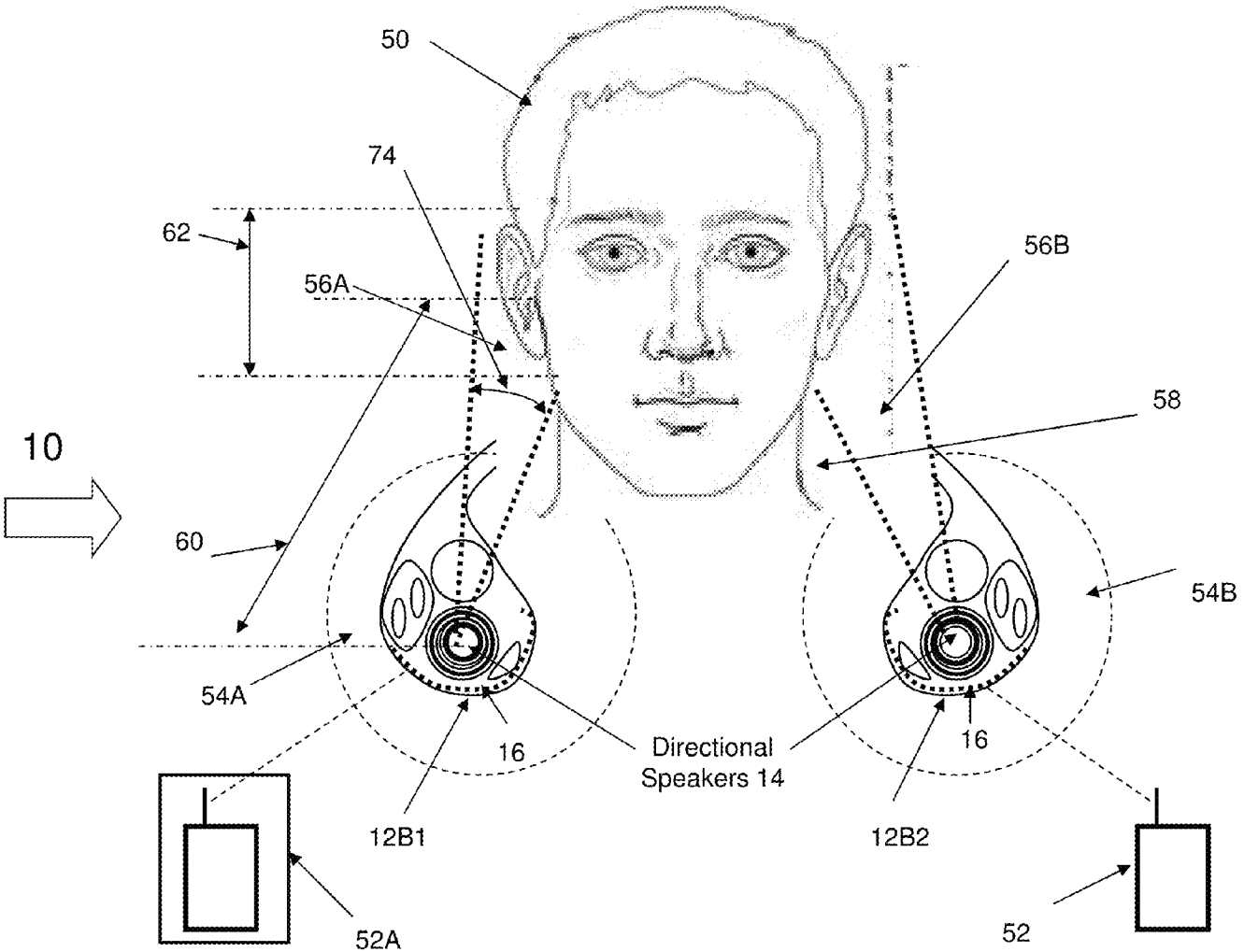
FIG. 2C is a diagram of a wireless extension collar of the embodiments herein shown around the neck of a human and the placement of the directional speakers on the collarbone area.

With initial reference to FIGS. 2A, 2B and 2C, a wireless extension collar 10 is illustrated. FIGS. 2A and 2B, plan and elevation views respectively illustrate features of the wireless extension collar 10. FIG. 2C illustrates how the collar 10 is used by being placed around the neck of a human.

Figure 3A:
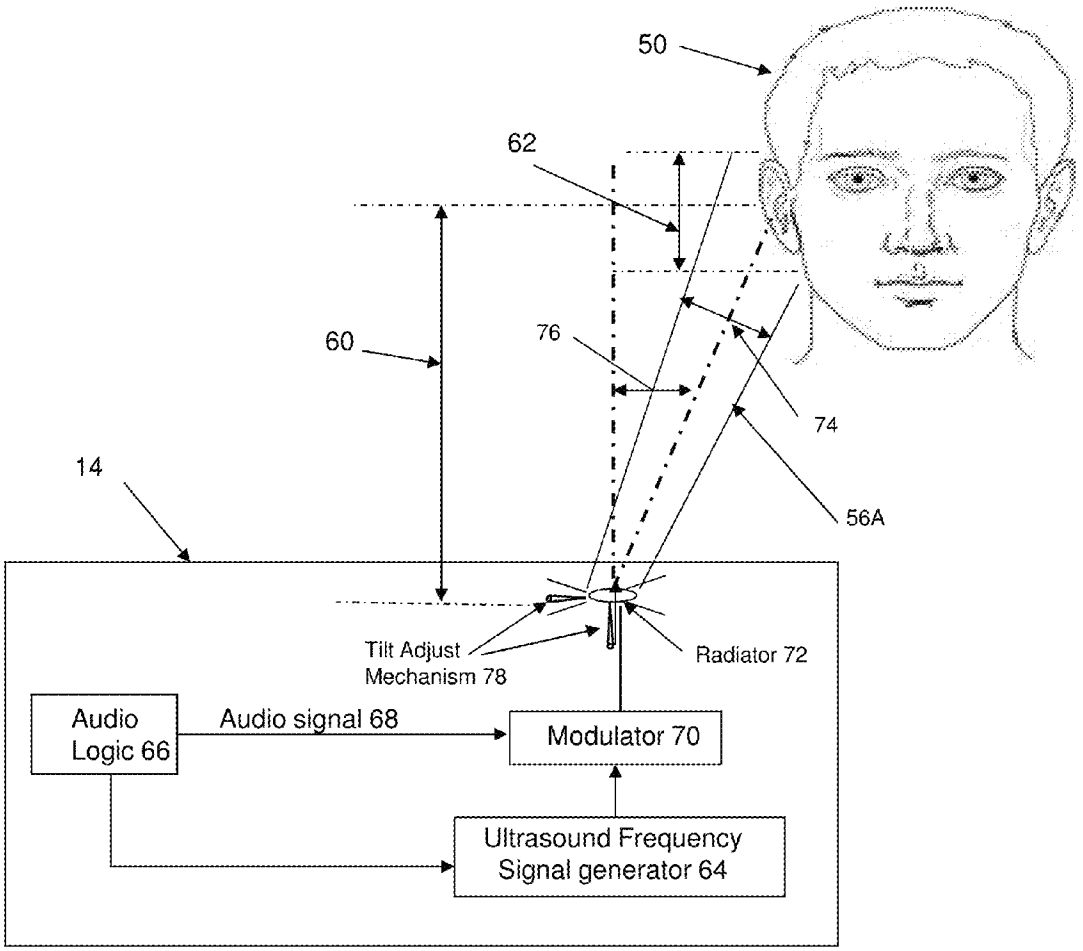
FIG. 3A is a block diagram of a directional speaker of the wireless extension collar of the embodiments herein.
Figure 3B:
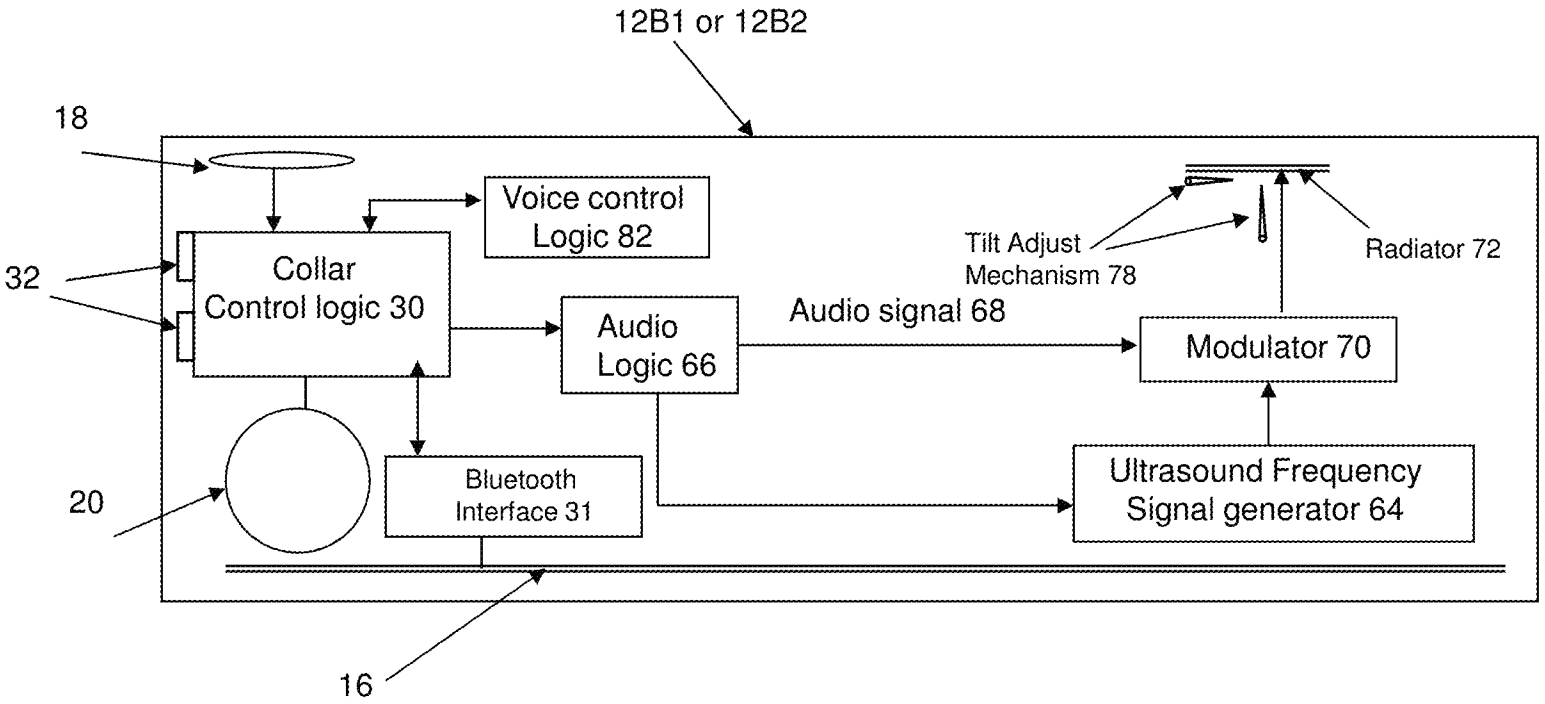
FIG. 3B is a block diagram of a directional speaker of the wireless extension collar and associated functions of the embodiments herein.
Figure 3C:
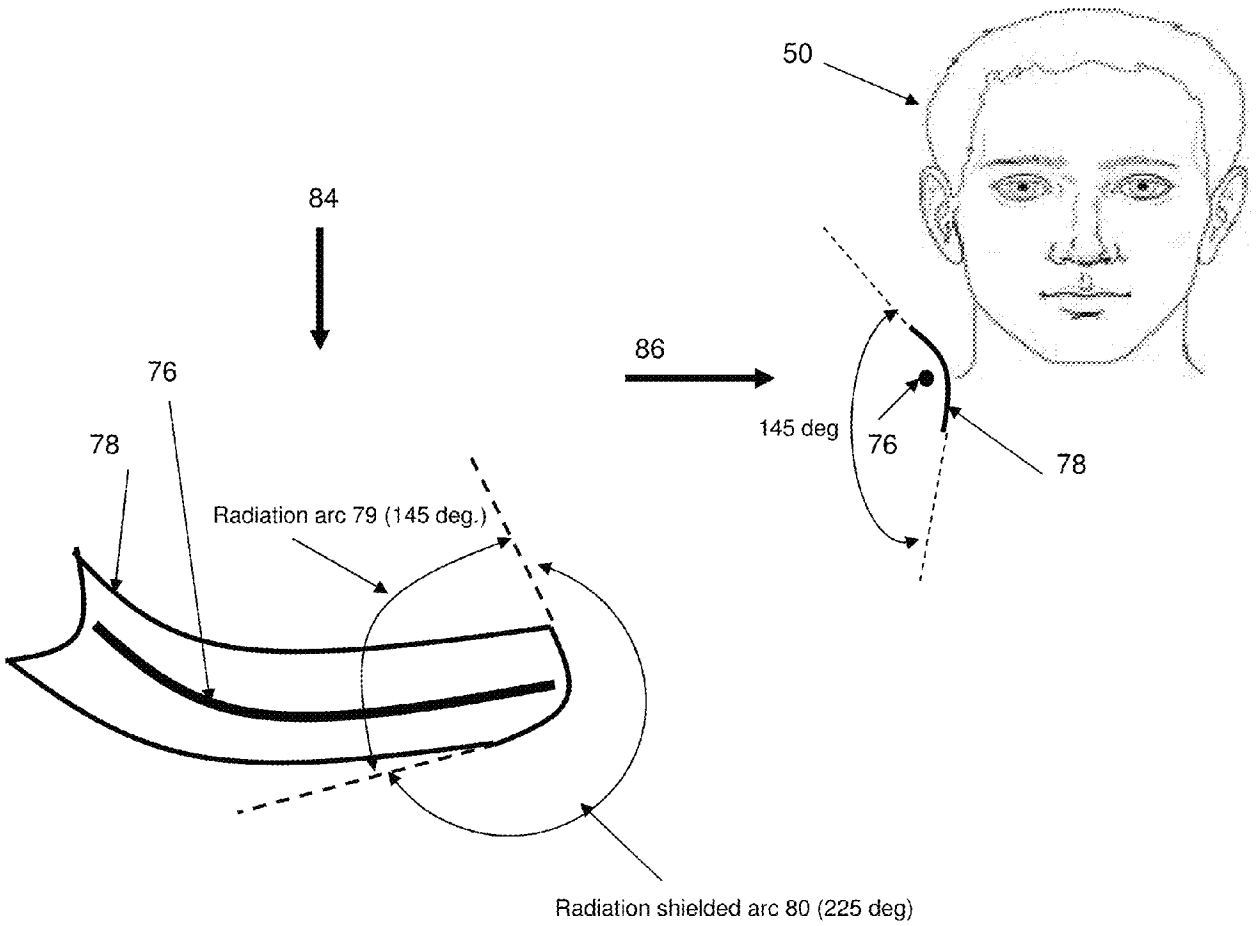
FIG. 3C is a block diagram that illustrates a directional transmitting antenna for use in the wireless extension collar.
Figure 4A:
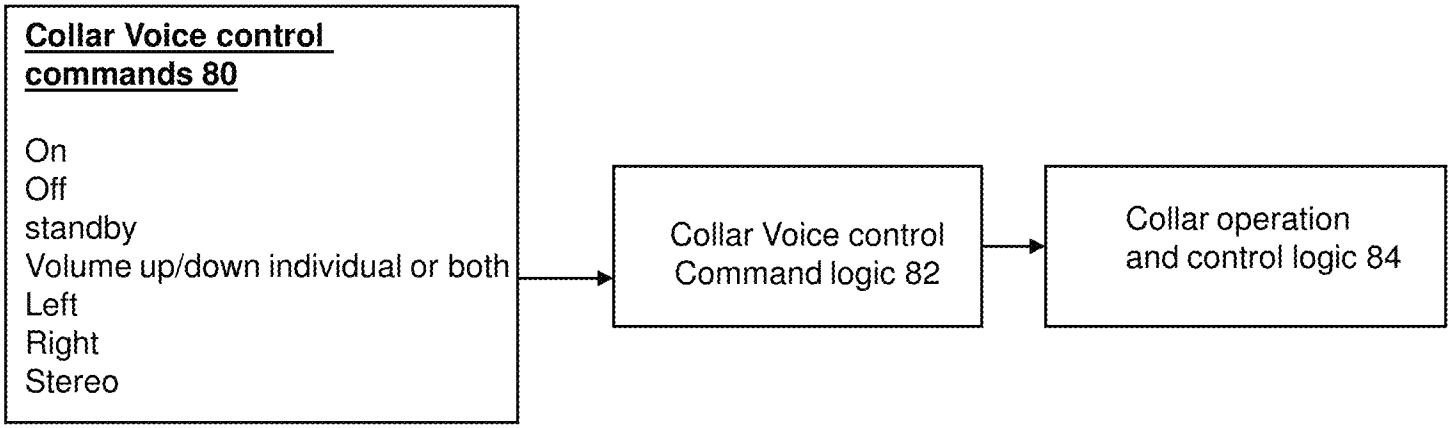
FIG. 4A is block diagram that illustrates use of voice control commands for the wireless collar.
Figure 4B:
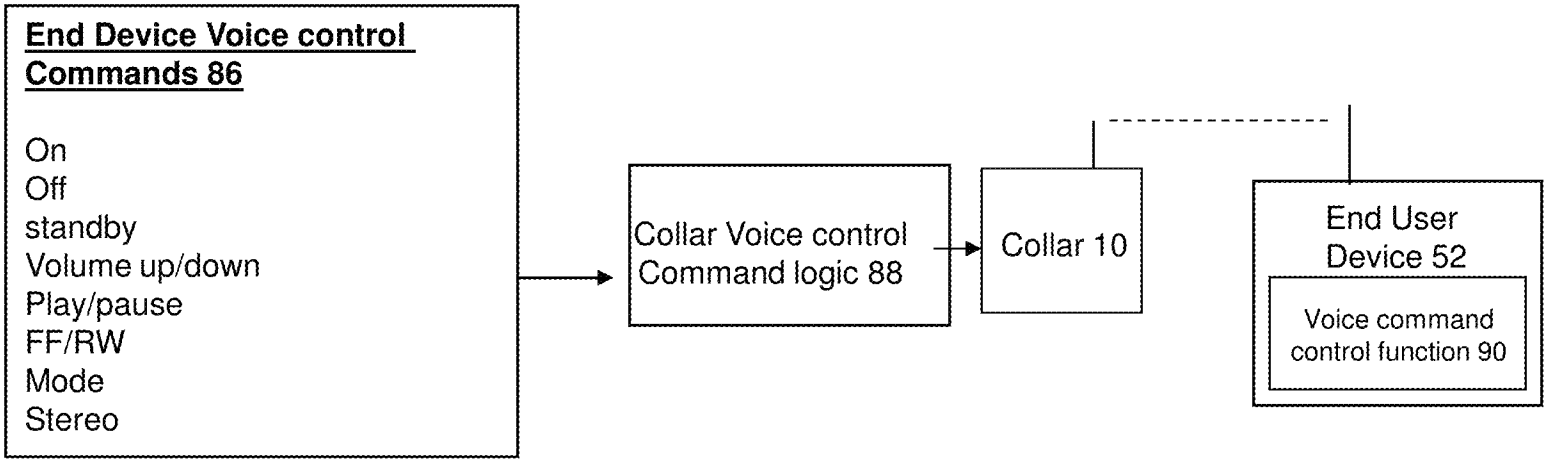
FIG. 4B is a block diagram that illustrates use of voice control commands for the end-user devices.

FIG. 3A illustrates the features of a directional speaker as used in the collar 10. FIG. 3B illustrates the functions of the collar 10 with associated functions and electronics. FIG. 3C illustrates an optional directional transmitting antenna that may be used in the collar 10. FIG. 4A illustrates the use of voice control commands for the collar. FIG. 4B illustrates the voice control commands via the collar 10 for use with end-user devices.

Figure 5A:
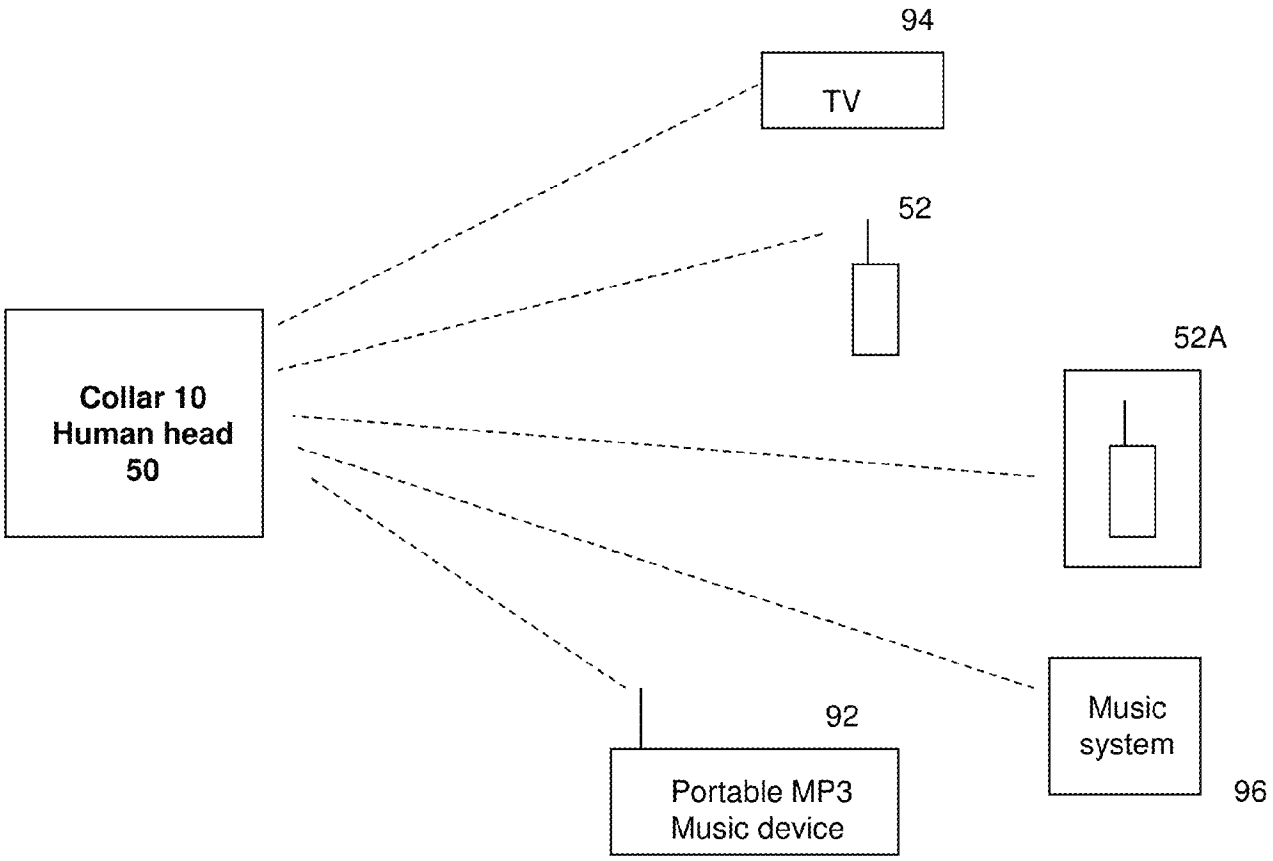
FIG. 5A is a block diagram that illustrates different uses for the wireless collar of the embodiments herein.
Figure 5B:
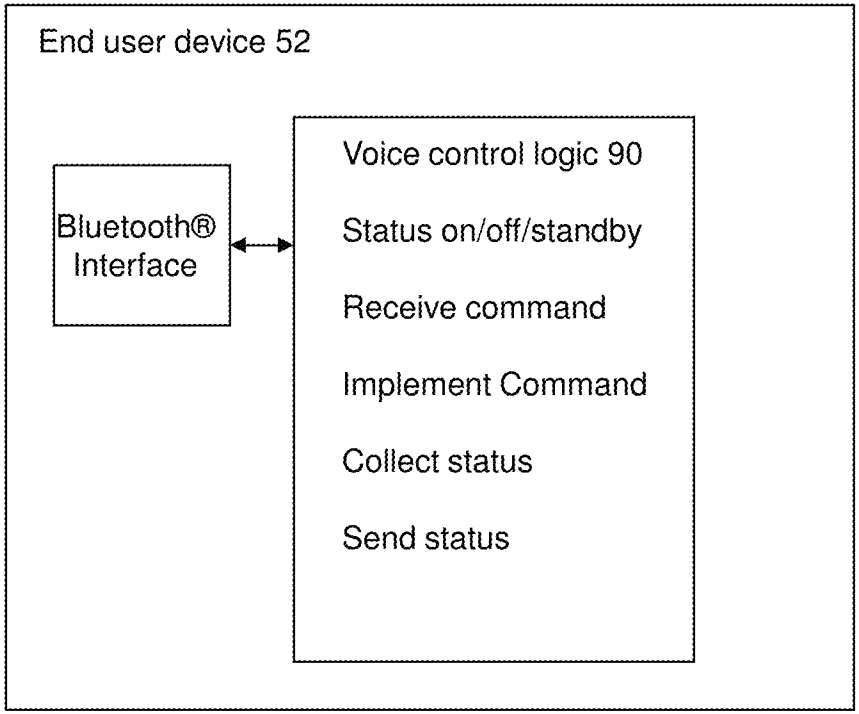
FIG. 5B is a block diagram that illustrates voice control logic in the end-user devices that would work with the wireless collar of the embodiments herein.

As illustrated in FIG. 5A, the wireless extension collar 10 may be used by a human 50 in different applications with different end-user devices. As illustrated in FIG. 5B, the collar 10 may work with many types of end-user devices that have their own voice control logic.

The collar 10 of the embodiments herein may be used in lieu of headphones, an earpiece, a Bluetooth earpiece, to wirelessly interface and connect to a variety of end-user devices that may include handheld, portable, fixed music systems, or audio-visual devices to hear music and audio. The collar 10 may also be used to communicate with these end-user devices to control their operation, where the collar 10 being worn around the neck provides for hands and head free operation. These and other features are illustrated where the headings are provided for reader convenience.

Wireless Extension Collar 10

As illustrated in FIG. 2A, the collar 10 has body 12 that may have join members 12A1 and 12A2 joined together by a joint 22. The body 12 has end-members 12B1 and 12B2 that house the directional speakers 14 along with battery 20, microphone 18, antenna 16, logic circuit 30 and controls 32. Each of the directional speakers 14 has a tilt mechanism 40 to fine tune the direction of the directional speakers toward the human ears.

As illustrated in FIG. 2A, the dimensions of the collar 10 are such that it when worn around the neck may have a width 36 of approximately 8 to 10 inches and a depth 38 of approximately 4 to 5 inches. Each end-member housing 12B1 and 12B2 has a width 34 of approximately two inches in diameter. These are notional size dimensions to illustrate the embodiments of the collar 10.

The housing 12B1 houses, directional speaker 14, control logic 30, user accessible controls 32, and microphone 18. The housing 12B1 is designed to lie flat on the collarbone and the joining member 12A1 is designed to be around the neck. The joining member 12A1 and the housing 12B1 may be made of material that is flexible and skin smooth.

FIG. 2B illustrates an elevation view and illustrates housing 12B1, joining member 12A1 joined with the help of hinge joint 24. A joint 22 joins the left and right side of the collar 10. The housing 12B1 may be approximately ¼" inch high and it may be little less or a little more. The size of the housing 12B1 may be about a couple of inches. These are notional dimensions to illustrate the features of the collar 10 for making it suitable for wearing around the neck.

As illustrated in FIG. 2C, such a size of the collar provides for the collar 10 to be worn around the neck where the members 12B1 and 12B2 with the directional speakers 14 are positioned on the right and left collarbone areas 54A and 54B respectively of the human.

Use of Wireless Extension Collar 10 Around a Human Head 50

As illustrated in FIG. 2C, the collar 10 is shown placed around the human head 50 near the neck 58. The end-members 12B1 and 12B2 with directional speakers 14 of the collar 10 are positioned on the collarbone areas 54A and 54B. The collar 10 with the antenna 16 wirelessly communicates with an end-user handheld communication device 52 or a desk based communication device 52A.

The directional speakers 14 generate beams 56A and 56B directed towards the left and right ears respectively of the head 50. The diagonal distance 60 of the directional speaker 14 from the ear is estimated to be seven inches, the width of the ear 62 is estimated to be three inches, and the width of the beam 74 from the directional speaker to the human ear is estimated to be approximately 10 degrees to cover the human ear width 62.

It is believed that the movement of the head side ways or up and down within limits is not likely to affect the operation of the collar 10. As a simplified illustration, if the head is moved left or right as much as 45 degrees a minor change in the relative position and angle of the ears to the directional speakers is not likely to affect the operation of the collar. Similarly, if the head is tilted up or down from the straight position a minor change in relative position and angle of the ears to the directional speakers is not likely to affect the operation of the collar.

As illustrated in FIG. 3A, the directional speaker 14 has an ultrasound frequency signal generator 64, a modulator 70 and an audio logic 66 which produces the audio signal 68. The modulator 70 modulates the ultra sonic frequency carrier with the audio signal and feeds the modulated signal to a radiator 72. The radiator 72 may be in the form of a disk that radiates the ultrasonic signal based on the Piezo electric effect. The radiator 72 has tilt mechanism 78 that can be used to fine tune the tilt angle 76 of the radiator 72 to tilt the radiated beam 56A, with beam width 74, towards the center of the ear of the human head 50.

As illustrated in FIG. 3B, the end-members 12B1 and 12B2 house the directional speakers 14 and the associated collar functions. What are shown are user controls 32, collar logic 30, voice control logic 82, audio logic 66, Bluetooth interface logic 31, battery 20, microphone 18, and antenna 16. There may be memory and storage elements (not shown) as part of the collar functions that may be used to store programs and parameters relevant to the operation of the collar 10. There may also be external interface connector (not shown) that may be used to initialize, load and update new programs and parameters in the control logic.

Also shown are the elements of a directional speaker to include ultrasound frequency generator 64, modulator 70, radiator 72 and radiator direction adjustment mechanism 78. The tilt or direction adjustment mechanism 78 may use prior art arrangement of screws at 90 degree angle to each other.

There may be different embodiments, where the end-members 12B1 and 12B2 house the duplicate and mirror image of the entire system of FIG. 3B. Alternatively, the speaker elements, except the radiator element, may be housed in one end-member 12B2 and the collar logic and functions may be housed in the end-member 12B1. The radiator element 72 with the adjust mechanism 78 will be housed in both end-members 12B1 and 12B2.

The battery 20, antenna 16 and microphone 18 may also be housed in both housings 12B1 and 12B2. There may be other arrangements for housing the collar functions and the speaker functions and they are not ruled out.

Directional Speaker 14

Based on information obtained from the Holosonic Research Lab Inc., Watertown, Mass., the technology behind the directional speakers may be miniaturized and made in the form-factor that would be suitable for cell phones. The ultrasonic radiator uses piezo-electric technology and is in the form of a thin surface or membrane.

Therefore, it is believed, that a directional speaker along with associated electronics for use in collar 10 may be made in the form-factor of approximately two inches in diameter and approximately a quarter of an inch high. These dimensions may be a little less or little more and are notional dimensions for the specific use in the collar 10. The weight of the directional speaker along with the associated electronics in an end-member 12B1 or 12B2 may be of the order of a few ounces, making the weight of the collar 10 around a few ounces.

Therefore, the directional speaker 14 may be designed and manufactured in a form-factor suitable for the collar 10 application as has been described above. The radiator is based on the piezo effect and may be a few millimeters thick and around a few inches in diameter. The width of the ultrasonic beam emanating from the directional speaker is based on the size of the radiator. The energy of the beam is based on the energy in the ultrasonic frequency radiation. The power of the ultrasound energy in the beam determines the useful distance the beam can be projected.

Based on the specific application in the collar 10, the range of the directional speaker would be limited to a distance between the position of the directional speaker on the collar, which is worn around the human neck and the relative position of the human ear from the directional speaker on the collar. This distance is estimated to be around seven inches or so and may different for people with different physiques.

Based on data from Audio Spot Light® AS-16 Technical Specification of Holosonic Research Lab Inc., a speaker surface size of 15.75" square or about 245 sq. inch has listed a max power of 25 watts. Another Audio Spot Light® AS-24 with a speaker surface of 24 inches square has a listed maximum power of 65 watts. These are square dimensions but can also be circular dimensions as the speakers may be made in a disk form of various sizes.

From the information in the Audio Spotlight data sheet, Audio Spot Light systems are much less sensitive to listener distance than traditional loudspeakers. The optimum performance is attained at roughly 1-2 m (3-6 ft) from the speaker. Using this data as a guide, it is believed, the power needed for the ultrasound directional speaker as used in the collar 10 application would be around a couple of watts.

Based on prior art data on directional speakers from Holosonic Research Lab, the frequency of the ultrasonic wave may be of the order of 65 KHz and the audio signal that is modulated on this ultrasonic carrier wave may be 100 to 10 KHz making the collar suitable for most music listening in addition to audio speech listening.

Based on the information from Holosonic, the modulation that is used may be a proprietary modulation algorithm to minimize distortion in the audio and the audio is heard by the receiver or the human ear without any demodulation required.

The power of the audio signal that is modulated on the ultrasonic signal determines the volume of the audio signal, as the sound signal that is riding on the ultrasonic carrier wave is fed directly to the ear. Therefore the audio power requirements of the directional speakers as used in collar 10, it is believed, would be comparable to the power requirements of the prior art headphones.

It is believed, the desired audio power of the directional speakers based on similar headphone applications is likely to be of the order of tenth of a watt. It could be more or less but it is believed that a power output in the range of 100 Millie watts to 300 Millie watts would provide a required degree of audio volume control.

Considering the wattage, distance projection and speaker size of Audio Light Systems AS 16 of 25 watts, 6 feet of projection, with a radiator size of approximately 250 square inches, and scaling to the directional speakers as used in collar 10, it is believed, a speaker size of 2.25 square inches or a square of about 1.5 inch would be needed.

Hence the size of a directional speaker as used in collar 10, it is believed, would be about 1.5 inch square, a size suitable for placement in the end-members 12B1 and 12B2 of the collar 10. These are approximate and notional specifications to provide a perspective on the size and rating of the directional speakers and may be different than these based on actual use in the collar 10.

Microphones 18

Microphones are common in prior art and are used in a variety of applications that include headphones for secretaries, and Bluetooth earphones that work with cell phones and in cell phones themselves. Any of these microphones may be adapted for use in the wireless collar 10. No specific claim is made to microphone technology other than how they are used in the wireless collar 10.

Further, the collar 10 may have a single microphone or a dual microphone in each end-member of the collar 10. If dual microphones are used, they may be used as part of audio pick up technology to improve the quality of the audio pick up. These are considered prior art technologies and no specific claim is made for these microphones.

These microphones 18 in the collar 10 are positioned on the part of the collar, as illustrated, and thus would be in an optimum position to pick up human voice signals of the human wearing the collar 10 around the neck.

Antennas 16

There are two antennas in collar 10, one on each side of the collar and in each of the end-members. Alternatively, there may be a single antenna that traverses the entire length of the collar including inside the join members 12A1 and 12A2, behind the neck. The antennas may be positioned in a better part of the collar including the end-members and the joint member around the neck. Both of these antennas arrangements may be used for reception and transmission of RF signals between the wireless collar and the other end-user wireless devices.

A position of the antenna below the neck on the collar-bone areas keeps the transmitted radiation away from the head area relative to Bluetooth ear pieces and cell phones held next to the head. That is, in the collar 10, there is approximately eight inches of physical separation from the antenna location to the physical location of the brain of a human wearing the collar.

Optionally and alternatively, one antenna may be used exclusively for transmission and one used for reception. To further alleviate this type of concern related to radiation, optionally the transmitting antenna may be made a directional antenna that directs the transmitted radiation to areas away from the head. The technology of directional antennas is prior art and no specific claim is made to such technology except how it is used in the collar 10.

As illustrated in FIG. 3C, a perspective view 84 and a side view 86 of the antenna 16 are shown that provides for such a directional transmitting antenna in the collar 10. The antenna in the form of a wire 76 may be placed inside or surrounded by a shield 78 with a radiation arc 79 that radiates in all the direction except an arc 80 for the head area of a user wearing the collar.

That is, the shield 78 may have a parabolic shape opening of approximately around 145 degrees and thus keep radiation away from a 225 degree angle that would keep radiation away from the head area. Such a directional transmitting antenna may be positioned on the better part of the length of collar 10 so that the no matter how the human is positioned relative to the other end-user wireless device, the communication between the collar 10 and the other end-user wireless device would not be hindered.

FIG. 3C illustrates the concept of such a directional antenna with a reflector or a shield 78 that keeps transmitted radiation away from the head area. The radiation can still spread and reach the end-user wireless devices that are paired with the wireless collar 10.

Any Bluetooth spectrum that is suitable for such personal wireless device may be used. Bluetooth protocols provide for pairing and security between two Bluetooth equipped devices. Such prior art technology may be used and would be equally applicable to the collar 10.

Voice Command Control

As illustrated in FIG. 4A, the collar 10 functions may be operated with a voice command. The voice control of the collar may be activated and work in conjunction with manual controls 32 on the collar as shown in FIG. 2A. As a simplified illustration, the manual controls 32 may be used to turn on and off the voice command features of the collar 10. The voice commands 80 for controlling the operation of the collar 10 may include, on/off, standby modes, left, right or stereo modes and volume control for either the left or right or both the directional speakers. There may be other voice commands that are not ruled out. Collar voice control logic 82 receives the voice commands 80 and outputs the control commands to the collar control logic 84.

As illustrated in FIG. 4B, a set of voice control commands 86 may be used to control the functions of the end-user device 52. These voice commands may include on/off, standby modes, volume up/down, play/pause, fast forward/rewind, and operation mode depending upon the end-user device. These commands are received by the logic 88 in the collar 10 and forwarded via the collar 10 to the end-user device 52. It is assumed that the end-user device 52 is equipped with a voice command control function 90.

As illustrated in FIG. 5A, the collar 10 working around the human head 50 may be used to receive audio from, and control, end-user devices such as a TV 94, cell phone 52, desk phone 52A, music system 96 or portable music device 92, assuming such devices provide features for voice control and are equipped with a wireless function to connect to the wireless collar 10.

As illustrated in FIG. 5B, the end-user device 52 would have a corresponding Bluetooth interface for pairing with the collar device 10 and would have voice control logic 90 that provides for functions that include, control of device status from on/off and standby, receive command, implement command, collect status, and send status.

A personal use wireless extension listening device that wirelessly connects to an end-user device, has a collar that has two end-members and a joining member, the joining member connects the two end-members, wherein, when the collar is worn around the neck of a human, the joining member is positioned behind the neck and the two end-members are positioned on the two collarbone areas next to the neck.

The end-members have positioned directional speakers therein; the speakers radiate sound in the direction of the ears of the human wearing the collar around the neck, wherein the personal use listening device is used to listen to audio that is wirelessly received from the end-user device.

The directional speakers use an ultrasound frequency carrier wave modulated by an audio signal to deliver audio sound to human ears without a demodulator.

The end-members of the collar house, integrated circuits, controls, wireless circuits, transmitting and receiving antennas, microphones and batteries, in addition to the directional speakers so that the end-members may also function as a wireless communication device, to end-user wireless device. The integrated circuits have embedded logic to perform the various function of the collar 10 as described herein.

The integrated circuits have a logic for receiving voice command of the human wearing the collar to control operation of the personal use device including, turning the personal use device on/off, activating a right or a left side of the personal use device, and turning audio volume up and down.

The integrated circuits has a logic for receiving voice commands from the human wearing the collar that control the operation of the end-user wireless device and wirelessly transmit such commands to the end-user device.

The integrated circuits also have a logic for receiving device status data from the end-user device and translate the end-user device status data into audio signals for the human wearing the collar.

The voice commands and device status data are used to effect change in the operational mode of the device for communication, music, computations, record, send and enter data and images in the end-user device, wherein the end-user device is from a group of a music system, a mobile wireless communication device, a desktop communication device, and an audio/video recording device.

The transmitting pattern of the transmitting antenna in each of the end-members is oriented below the neck of the user to keep transmitted radiation away from the head area of the human wearing the collar.

The wireless extension device has a joint in the center of the joining member that joins two halves of the collar, where the joint is used to facilitate removal and wear of the collar on the human neck. The joint has a feature to adjust the collar for different human neck sizes. The joining member has hinges for movement between end-members and the joining member that facilitate positioning the end-members with the speakers flat on the collarbone area.

The end-members have a tilt mechanism to tilt and fine tune the orientation of the directional speakers towards the human ears.

The collar is made of a light weight material from a group of plastic, rubber, and aluminum, or a combination thereof. The end-members have rubber cushions that facilitate the end-members to stay on the collarbones.

In another embodiment, a personal use wireless extension device to an end-user device, has a collar that has two end-members and a joining member, the joining member connects the two end-members, wherein, when the collar is worn around the neck of a human, the joining member is positioned behind the neck and the two end-members are positioned on the collarbone areas next to the neck.

The end-members have positioned directional speakers and microphones therein, the speakers radiate sound in the direction of the ears of the human wearing the collar around the neck; and the microphones pick up voice commands of a user wearing the collar, thereby the collar is used as an interface to an end-user electronic device.

The end-members of the collar house integrated circuits with embedded logic, controls, wireless circuit, antenna, and battery. The end-members function as wireless extensions of other wireless devices that may include, communication devices, music devices, and audio visual appliances that may be used in an automobile, in a home, or office environment.

The transmitting pattern of the antenna in each of the end-members is oriented to be below the neck of the user to keep transmitting radiation away from the head area of the user of the collar.

The integrated circuits have a logic for receiving voice command of the human wearing the collar to control operation of the personal use device including, turning the personal use device on/off, activating a right or a left side of the personal use device, and turning audio volume up and down.

The integrated circuits has a logic for receiving voice commands from the human wearing the collar that control the operation of the end-user wireless device and wirelessly transmit such commands to the end-user device.

The integrated circuits also have a logic for receiving device status data from the end-user device and translate the end-user device status data into audio signals for the human wearing the collar.

Modes of Operational Use

Different modes of operational use of the embodiments are illustrated herein. In one mode of use, the collar may be used with cell phones or portable wireless communication devices. Since the cell phones are indispensable for the masses and are used throughout the day at any time, the extension collar may be used in lieu of a prior art Bluetooth ear piece.

In this embodiment, a user may choose to activate either the left side or the right side of the collar for hands free and ear free communication. The cell phone may be placed in the pocket and or carried on the body or placed in the vicinity. Bluetooth may be used for communication between the collar and the cell phone. The collar may be used to pick up a phone connection, hang up a phone connection or carry out an audio conversation.

In another mode of operational use, the user may choose to use the collar for hearing music from a portable device that may be carried with the person. In such a mode, the user may prefer to activate both sides of the collar for stereo music sound. In this mode, the collar in conjunction with the portable music device may be used to issue voice commands to the portable music device that may include a variety of commands such as play, stop, fast forward, rewind, skip, select a play list, select a item from a play list, etc.

In yet another mode of operational use, the user may choose to use the collar for hearing music from a fixed music system device in a home setting or in a vehicle. In such a mode, the user may prefer to activate both sides of the collar for stereo music sound. In this mode also, the collar in conjunction with the music system may be used to issue voice commands that may include a variety of commands such as play, stop, fast forward, rewind, skip, select a play list, select a DVD from a play list etc.

In yet another mode of operational use, the collar may be paired with a control and command system. Such command and control systems are prior art and no specific claim is made for them. In such a mode of use the collar may be used to issue voice commands and receive audio from status information. As a simplified illustration, the collar may be used to control a home lighting system and/or home appliances. As a simplified illustration, the voice command may turn a bedroom light on and receive a status such as dishwasher operation completed. As another simplified illustration, the voice command may be used to unlock the front door and status information may be received that the back door is open.

There may be other modes of operation than those described above and are not ruled out. The embodiments herein are on apparatus and method that has a wireless extension collar that is paired to work with other end-user devices that may include cell phones, music devices and command and control systems. The Bluetooth pairing technology is prior art. For such modes of operation, the collar extension may be worn for the better part of the day and may need to taken off when going to bed.

Method of Operation

With reference to FIG. 6, a method for a wireless extension collar 10 has the following steps, where all the steps may not be used or used in the order specified.

At step 100, creating a collar that has two end-members and a joining member, the joining member connects the two end-members, wherein, when the collar is worn around the neck of a human, the joining member is positioned behind the neck and the two end-members are positioned on the collarbone areas next to the neck.

At step 102, positioning directional speakers in the end-members for radiating audio sound in the direction of the ears of the human wearing the collar around the neck, and using the directional speakers to wirelessly listen to audio that is wirelessly received from the end-user device.

At step 104, using an ultrasound frequency carrier wave modulated by an audio signal in the directional speakers use to deliver audio sound to human ears without a demodulator.

At step 106, housing in the end-members of the collar, integrated circuits with embedded logic, controls, wireless circuits, transmitting and receiving antennas, microphones, and batteries, in addition to the directional speakers;

At step 108, using the end-members as a wireless communication device to end-user wireless devices.

At step 110, providing a logic in the integrated circuits for receiving for voice command to control operation of the personal use device, including, turning the device on/off, activating right side or left side or both sides of the device, and turning volume up and down.

At step 112, providing a logic in the integrated circuits for receiving voice commands that control the operation of the end-user wireless device and wirelessly transmit such commands to the end-user device;

At step 114, proving a logic in the integrated circuits for receiving device status from the end-user device and translate the end-user device status data into audio signals for the human wearing the collar;

At step 116, using the voice commands to change operation mode for communication, music, computations, record, send and enter data and images in the end-user device, wherein the end-user device is from a group of a music system, a mobile wireless device, a desktop communication device, and an audio/video recording device.

At step 118, orienting the transmitting pattern of the transmitting antenna in each of the end-members below the neck of the human to keep transmitted radiation away from the head area of the human wearing the collar.

At step 120, creating a joint in the center of the joining member that joins two halves of the collar, where the joint is used to facilitate removal and wear of the collar on the human neck.

At step 122, adjusting the joint to adjust the collar for different human neck sizes.

At step 124, providing hinges for movement between end-members and the joining member that facilitate positioning the end-members with the speakers flat on the collarbone area.

At step 126, providing a tilt mechanism to fine tune the orientation of the directional speakers towards the human ears.

At step 128, making the collar of a light weight material from a group of plastic, rubber, and aluminum, or a combination thereof;

At step 130, having rubber cushions in the end-members that facilitate the end-members to stay on the collarbones.

In summary, the embodiments herein are on apparatus and method that has a wireless extension collar that is paired to work with other end-user devices that may include cell phones, music devices and command and control systems. The collar is worn around the neck and has directional speakers thus obviating headphone and ear piece based wireless communication. Thus the apparatus and method for collar 10 provide a hand free and head free audio connection and voice control of other end-user devices that may be worn better part of the day.

While the particular embodiments, as illustrated herein and disclosed in detail are fully capable of obtaining the objective and providing the advantages herein before stated, it is to be understood that it is merely illustrative of the presently preferred embodiments of the invention and that no limitations are intended to the details of construction or design herein shown other than as described in the appended claims.

The invention claimed is:

1. A personal use wireless extension [listening] device that wirelessly connects with an end-user wireless device, comprising:

a. a collar that has two end-members and a joining member, the joining member connects the two end-members, wherein, when the collar is worn around *the* neck of a human, the joining member is positioned behind the neck and two end-members are positioned on two collarbone areas below *the* ears and next to the neck;

b. the *two* end-members of the collar have positioned *thereon* directional speakers and *a radiator including* tilt mechanisms therein, the tilt mechanisms adjust the direction of the speakers [for the speakers] to radiate sound above in direction of the ears of the human wearing the collar around the neck, *wherein the radiator is a disk that radiates an ultrasonic signal using a Piezo electric effect, wherein* the personal use wireless extension [listening] device is used to listen to audio that is wirelessly received from an end-user wireless device; wherein the end-user wireless device is from a group of, a music system, a mobile wireless communication device, a desktop communication device, and an audio/video recording device*, and wherein the directional speakers comprise an ultrasound frequency signal generator, an audio logic to produce an audio signal, and a modulator to modulate an ultra-sonic frequency carrier wave with the audio signal to direct audio sound towards the ears of the human*; *and* c. the end members *each including: at least one antenna for the transmission and reception of wireless signals between the personal use wireless extension device and the end-user wireless device, wherein a transmitting pattern of a transmitting antenna in each of the end-members is oriented below the neck of the user; and circuitry that receives voice commands from the human to control the end-user wireless device*[of the collar house integrated circuits with embedded logic, the embedded logic receives voice commands from the human and a device status from the end-user wireless device to control an operational mode for communication, music, computations, record, send and enter data and images in the end-user wireless device].

2. The personal use wireless extension device as in claim 1, comprising:

the end-members of the collar house integrated circuits with embedded logic, controls, wireless circuits, transmitting and receiving antennas, microphones, and batteries, in addition to the directional speakers, wherein the end-members also function as a wireless communication device, to the end-user wireless device.

3. The personal use wireless extension device as in claim 2, comprising:

the integrated circuits have [a] *embedded* logic [for receiving] *that receives a* voice command of the human wearing the collar [to control] *wherein the voice command is for controlling* operation of the personal use wireless extension device[on/off, activating a right or a left side of the personal use wireless extension device, and turning audio volume up and down].

4. The personal use wireless extension device as in claim 2, [comprising:

a. the integrated circuits have a logic for receiving voice commands from the human wearing the collar that control operation of the end-user wireless device and wirelessly transmit such commands to the end-user wireless device;

b. the integrated circuits also have a logic for receiving device status data from the end-user wireless device and translate the end-user wireless device status data into audio signals for the human wearing the collar;

c.] *wherein* the voice commands and the *a* device status [data] *received by the embedded logic from the end-user wireless device* are used to effect change in the operational mode for communication, music, computations, record, send and enter data and images in the end-user wireless device.

5. The personal use wireless extension device as in claim [2]*1*, [comprising:

a transmitting pattern of the transmitting antenna in each of the end-members is oriented below the neck of the user to keep transmitted radiation away from head area of the human wearing the collar] *wherein, instead of one or more antennas being located in the end-members, and antenna is located in the joining member*.

6. The personal use wireless extension device as in claim 1, comprising:

a. a joint in the center of the joining member that joins two halves of the collar, the joint facilitates removal and wear of the collar on the human neck; *and* b. the joint [has a feature] *being used* to adjust the collar for different human neck sizes.

7. The personal use wireless extension device as in claim 1, comprising:

the joining member has hinges for movement between end-members and the joining member that facilitate positioning the end-members with the *directional* speakers flat on the collarbone area.

8. The personal use wireless extension device as in claim 1, comprising:

[the end-members have a tilt and fine tune an orientation of the directional speakers toward the human ears] *the two end-members of the collar have positioned thereon a tilt mechanism to adjust the direction of the directional speakers for the directional speakers to radiate sound toward the ears of the human wearing the collar around the neck and fine tune an orientation of the directional speakers towards the human ears*.

9. A method for a personal use wireless extension [listening] device that wirelessly connects with end-user device, comprising steps of:

a. creating a collar that has two end-members and a joining member, the joining member connects the two end-members, wherein, when the collar is worn around *neck* of a human, the joining member is positioned behind the neck and the two end-members are positioned on *two* collarbone areas below *the* ears and next to the neck;

b. positioning directional speakers and *a radiator including* tilt mechanisms in the end-members and adjusting by tilt mechanisms direction of the speakers for radiating audio sound above in a direction of the ears of the human wearing the collar around the neck, [and using] *wherein* the directional speakers *are used* to [wirelessly] listen to audio that is wirelessly received from the end-user wireless device; *wherein the radiator is a disk that radiates an ultrasonic signal using a Piezo electric effect,* wherein the end-user wireless device is from a group of, a music system, a mobile wireless communication device, a desktop communication device, and an audio/video recording device*; and producing an audio signal by an audio logic of the directional speakers and modulating, by a modulator of the directional speakers, an ultra-sonic frequency carrier wave with the audio signal to direct audion sound towards the ears of the human; and* c. housing in the end-members[of the collar integrated circuits with embedded logic, receiving by the embedded logic voice commands from the human and a device status from the end-user wireless device for controlling an operational mode for communication, music, computations, record, send and enter data and images in the end-user wireless device]*: at least one antenna for the transmission and reception of wireless signals between the personal use wireless extension device and the end-user wireless device, wherein a transmitting pattern of a transmitting antenna in each of the end-members is oriented below the neck of the user; and circuitry that receives voice commands from the human to control the end-user wireless device*.

10. The method for the personal use wireless extension device as in claim 9, comprising steps of:

a. housing in end-members of the collar, integrated circuits with embedded logic, controls, wireless circuits, transmitting and receiving antennas, microphones, and batteries, in addition to the directional speakers; *and* b. using the end-members as a wireless communication device to the end-user wireless device.

11. The method for the personal use wireless extension device as in claim 10, comprising steps of:

providing [a] *embedded* logic in the integrated circuits [for receiving] *that receives a* voice command to control operation of the personal use *wireless extension* device[, including, turning the device on/off, activating right side or left side or both sides of the device, and turning volume up and down].

12. The method for the personal use wireless extension device as in claim 10, comprising steps of:

a. providing [a logic in the] integrated circuits for receiving voice commands that control operation of the end-user wireless device and wirelessly transmit such commands to the end-user wireless device; *and* b. providing [a logic in the] integrated circuits [for receiving] *that receives end-user* device status *data* from the end-user wireless device and [translate] *provide* the end-user device status data [into] *using* audio signals for the human wearing the collar[;

c. using the voice commands to change operation mode for communication, music, computations, record, send and enter data and images in the end-user wireless device, wherein the end-user wireless device is from a group of a music system, a mobile wireless device, a desktop communication device, and an audio/video recording device].

13. The method for the personal use wireless extension device as in claim [10] *9, wherein, instead of one or more antennas being located in the end-members, an antenna is located in the joining member* [comprising steps of:

orienting transmitting pattern of the transmitting antenna in each of the end-members below the neck of the human to keep transmitted radiation away from head area of the human wearing the collar].

14. The method for the personal use wireless extension device as in claim 9, comprising steps of:

a. creating a joint in the center of the joining member that joins two halves of the collar, the joint is used to facilitate removal and wear of the collar on the human neck; *and* b. adjusting the joint to adjust the collar for different human neck sizes.

15. The method for the personal use wireless extension device as in claim 9, comprising steps of:

providing hinges for movement between end-members and the joining member that facilitate positioning the end-members with the *directional* speakers flat on the collarbone area.

16. The method for the personal use wireless extension device as in claim 9, comprising steps of:

*positioning tilt mechanisms in the end-members;*

*adjusting by tilt mechanisms direction of the directional speakers to radiate audio sound toward the ears of the human wearing the collar around the neck; and*

[providing a] *adjusting the* tilt [mechanism] *mechanisms* to fine tune orientation of the directional speakers towards the human ears.

17. A personal use wireless extension device [to] *that wirelessly connects with* an end-user wireless device, comprising:

a. a collar that has two end-members and a joining member, the joining member connects the two end-members, wherein, when the collar is worn around neck of a human, the joining member is positioned behind the neck and the two end-members are positioned on the collarbone areas below *the* ears and next to the neck;

b. the end-members have positioned *thereon* directional speakers [with their] *comprising an ultrasound frequency signal generator, an audio logic to produce an audio signal, and a modulator to modulate an ultrasonic frequency carrier wave with the audio signal to direct audio sound towards the ears of the human, and a radiator including* tilt mechanisms, the tilt mechanisms adjust direction of the speakers [for the speakers] to radiate sound above in a direction of the ears of the human wearing the collar around the neck[;], *wherein the radiator is a disk that radiates an ultrasonic signal using a Piezo electric effect*; [and]

c. the end-members have also positioned therein microphones that pick up voice commands of a user wearing the collar, thereby the [collar is used as an interface to] *voice commands are used to control* the end-user wireless device; wherein the end-user wireless device is from a group of, a music system, a mobile wireless communication device, a desktop communication device, and an audio/video recording device;

d. [the end-members of the collar house integrated circuits with embedded logic, the embedded logic receives voice commands from the human and a device status from the end-user wireless device to control an operational mode for communication, music, computations, record, send and enter data and images in the end-user wireless device.]*the directional speakers playing audio that reflects device status data received from the end-user wireless device; and* e. *where the end members each include at least one antenna for the transmission and reception of wireless signals between the personal use wireless extension device and the end-user wireless device, wherein a transmitting pattern of the antenna in each of the end-members is maintained below the neck of the user.*

18. The personal use wireless extension device [to the end-user wireless device], as in claim 17, comprising:

a. the end-members of the collar house integrated circuits with embedded logic, controls, wireless circuit, antenna, and battery; *and* b. the end-members function as wireless extensions of other end-user wireless devices that include, communication devices, music devices, and audio visual appliances used in an automobile, in a home, or office environment.

19. The personal use wireless extension device as in claim 18, comprising:

a. the integrated circuits [have a logic for receiving] *that receive a* voice command of the human wearing the collar [to control] *wherein the voice command is for controlling* operation of the personal use *wireless extension* device [including, turning the personal use device on/off, activating a right or a left side of the personal use device, and turning audio volume up and down];

b. the integrated circuits [have a logic for receiving] *that receive* voice commands from the human wearing the collar that control operation of the end-user wireless device and wirelessly transmit such commands to the end-user device; *and* c. the integrated circuits [also have a logic for receiving] *that receive end-user wireless* device status data from the end-user wireless device and [translate] *provide* the end-user wireless device status data [into] *using* audio signals for the human wearing the collar.

20. The personal use wireless extension device[to an end-user device], as in claim 17, comprising:

[a transmitting pattern of the antenna in each of the end-members is oriented to be below the neck of the user to keep transmitting radiation away from head area of the user of the collar]

*the end-members have a tilt mechanism to tilt and fine tune an orientation of the directional speakers towards the human ears.*

*21. The personal use wireless extension device as in claim 1, wherein:*

*the end members each including a shield, surrounding the at least one antenna, having a radiation arc that radiates in all directions except an arc to keep transmitted radiation away from head area of the human wearing the collar.*

*22. The method for the personal use wireless extension device as in claim 9, wherein:*

*housing in the end-members a shield, surrounding the at least one antenna, having a radiation arc that radiates in all directions except an arc to keep transmitted radiation away from head area of the human wearing the collar.*

*23. The personal use wireless extension device as in claim 17, wherein, instead of one or more antennas being located in the end-members, an antenna is located in the joining member.*

*24. The personal use wireless extension device as in claim 17, wherein:*

*where the end members each include a shield, surrounding the at least one antenna, having a radiation arc that radiates in all directions except an arc to keep transmitted radiation away from head area of the human wearing the collar.*

*25. A personal use wireless extension device that wirelessly connects with an end-user wireless device, comprising:*

*a. a collar that has two end-members and a joining member, the joining member connects the two end members, wherein, when the collar is worn around the neck of a human, the joining member is positioned behind the neck and the two end-members are positioned on two collarbone areas below the ears and next to the neck;*

*b. the two end-members of the collar have positioned thereon directional speakers and a radiator including tilt mechanisms therein, where each directional speaker is located on each end-member, substantially farthest from joining member, and where the tilt mechanisms adjust the direction of the speakers for the speakers to radiate sound toward the ears of the human wearing the collar around the neck, the personal use wireless extension device is used to listen to audio that is wirelessly received from an end-user wireless device; wherein the end-user wireless device is from a group of, a music system, a mobile wireless communication device, a desktop communication device, and an audio/video recording device, and wherein the radiator is a disk that radiates an ultrasonic signal using a Piezo electric effect, and wherein the directional speakers comprise an ultrasound frequency signal generator, an audio logic to produce an audio signal, and a modulator to modulate an ultra-sonic frequency carrier wave with the audio signal to direct audio sound towards the ears of the human; and*

*c. the end members each include:*

*at least one antenna for the transmission and reception of wireless signals between the personal use wireless extension device and the end-user wireless device, wherein a transmitting pattern of a transmitting antenna in each of the end-members is oriented below the neck of the user to keep transmitted radiation away from the head area of the human wearing the collar; circuitry that receives voice commands from the human to control the end-user wireless device; and a shield, surrounding the at least one antenna, having a radiation arc that radiates in all directions except an arc to keep transmitted radiation away from head area of the human wearing the collar.*

* * * * *